United States Patent
Yamada

(10) Patent No.: US 10,006,326 B2
(45) Date of Patent: Jun. 26, 2018

(54) CRANK CHAMBER INTERNAL PRESSURE REDUCTION MECHANISM FOR INTERNAL COMBUSTION ENGINE

(71) Applicant: SUZUKI MOTOR CORPORATION, Hamamatsu-Shi, Shizuoka (JP)

(72) Inventor: Ikuo Yamada, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 63 days.

(21) Appl. No.: 15/399,090

(22) Filed: Jan. 5, 2017

(65) Prior Publication Data
US 2017/0198616 A1 Jul. 13, 2017

(30) Foreign Application Priority Data
Jan. 8, 2016 (JP) .................................. 2016-002662

(51) Int. Cl.
| F01M 13/00 | (2006.01) |
| F01M 13/02 | (2006.01) |
| F16F 15/26 | (2006.01) |
| F02B 61/02 | (2006.01) |

(52) U.S. Cl.
CPC ......... *F01M 13/021* (2013.01); *F16F 15/268* (2013.01); *F02B 61/02* (2013.01)

(58) Field of Classification Search
CPC ....... F01M 13/021; F16F 15/268; F02B 61/02
USPC ...................................................... 123/41.86
See application file for complete search history.

(56) References Cited

U.S. PATENT DOCUMENTS

| 1,766,900 A * | 6/1930 | Griswold | F01M 13/021 123/142.5 R |
| 2,254,064 A * | 8/1941 | Dressler | F01M 13/023 123/41.86 |
| 2,484,139 A * | 10/1949 | Witchger | F01M 13/02 123/198 R |
| 2,585,495 A * | 2/1952 | Phillips | F02M 13/04 123/41.86 |

(Continued)

FOREIGN PATENT DOCUMENTS

JP 2009-121326 A 6/2009

*Primary Examiner* — Marguerite McMahon
(74) *Attorney, Agent, or Firm* — Troutman Sanders LLP

(57) ABSTRACT

A crank chamber internal pressure reduction mechanism for internal combustion engine includes a crankshaft, a rotating shaft (a balancer shaft), a suction mechanism (a primary drive gear), a first discharge passage (a discharge passage, a joining passage, and a discharge hose), and a second discharge passage (a discharge passage). The crankshaft is rotatably supported to a crankcase. To the rotating shaft, a rotation force is transmitted from the crankshaft. The suction mechanism is disposed at the rotating shaft. The suction mechanism rotates integrally with the rotating shaft. To the first discharge passage, the emission is discharged from the crank chamber. The second discharge passage is communicated with the first discharge passage. The second discharge passage is disposed inside the rotating shaft. The suction mechanism includes a third discharge passage (a hole). The third discharge passage is communicated with the second discharge passage. The third discharge passage extends outside the rotating shaft in a radial direction to communicate with an external space.

3 Claims, 9 Drawing Sheets

(56) References Cited

U.S. PATENT DOCUMENTS

| | | | | | |
|---|---|---|---|---|---|
| 3,418,986 | A | * | 12/1968 | Scherenberg | F01L 3/24 123/188.9 |
| 4,947,806 | A | * | 8/1990 | Speer | F01M 13/00 123/198 C |
| 6,279,553 | B1 | * | 8/2001 | Brueggemann | F01M 3/04 123/192.2 |

* cited by examiner

CRANK CHAMBER INTERNAL PRESSURE REDUCTION MECHANISM FOR INTERNAL COMBUSTION ENGINE

CROSS-REFERENCE TO RELATED APPLICATIONS

This application is based upon and claims the benefit of priority of the prior Japanese Patent Application No. 2016-002662, filed on Jan. 8, 2016, the entire contents of which are incorporated herein by reference.

BACKGROUND OF THE INVENTION

Field of the Invention

The present invention relates to a crank chamber internal pressure reduction mechanism for internal combustion engine.

Description of the Related Art

Some saddle-ride type vehicles such as motorcycles include a crank chamber internal pressure reduction mechanism that forcibly suctions emissions such as blow-by gas and engine oil in a crank chamber of a crankcase and discharges the emissions outside the crank chamber.

A motorcycle disclosed in Patent Document 1 discloses an oil pump structure for internal combustion engine. The oil pump structure disposes a scavenging pump at a bottom of a crank chamber, which is formed by joining right and left crankcases, at the center in a right-left direction. Since the scavenging pump suctions and discharges oil in the crank chamber via a suction oil passage, the oil in the crank chamber can be efficiently discharged from the center at the bottom of the crank chamber.

Patent Document 1: Japanese Laid-open Patent Publication No. 2009-121326

However, disposing the scavenging pump as the crank chamber internal pressure reduction mechanism that forcibly suctions the emissions and discharges the emissions outside the crank chamber like Patent Document 1 increases the number of components, making the mechanism complicated. Additionally, a space to dispose the scavenging pump needs to be disposed in the crankcase. This increases a size in crankcase, thereby causing a problem of falling to reduce the weight.

SUMMARY OF THE INVENTION

The present invention has been made to solve the above-described problems, and an object of the present invention is to eliminate a dedicated component to discharge emissions in a crank chamber to reduce a size and a weight of a crankcase.

The present invention is a crank chamber internal pressure reduction mechanism for internal combustion engine that forcibly suctions an emission in a crank chamber of a crankcase to discharge the emission. The crank chamber internal pressure reduction mechanism includes a crankshaft, a rotating shaft, a suction mechanism, a first discharge passage, and a second discharge passage. The crankshaft is rotatably supported to the crankcase. To rotating shaft, a rotation force is directly or indirectly transmitted from the crankshaft. The suction mechanism is disposed at the rotating shaft. The suction mechanism rotates integrally with the rotating shaft. To the first discharge passage, the emission is discharged from the crank chamber. The second discharge passage is communicated with the first discharge passage. The second discharge passage is disposed inside the rotating shaft. The suction mechanism includes a third discharge passage. The third discharge passage is communicated with the second discharge passage. The third discharge passage extends outside the rotating shaft in a radial direction to communicate with an external space.

DETAILED DESCRIPTION OF THE PREFERRED EMBODIMENTS

The following describes preferred embodiments of a crank chamber internal pressure reduction mechanism for internal combustion engine according to the present invention with reference to the drawings.

Figure 1:
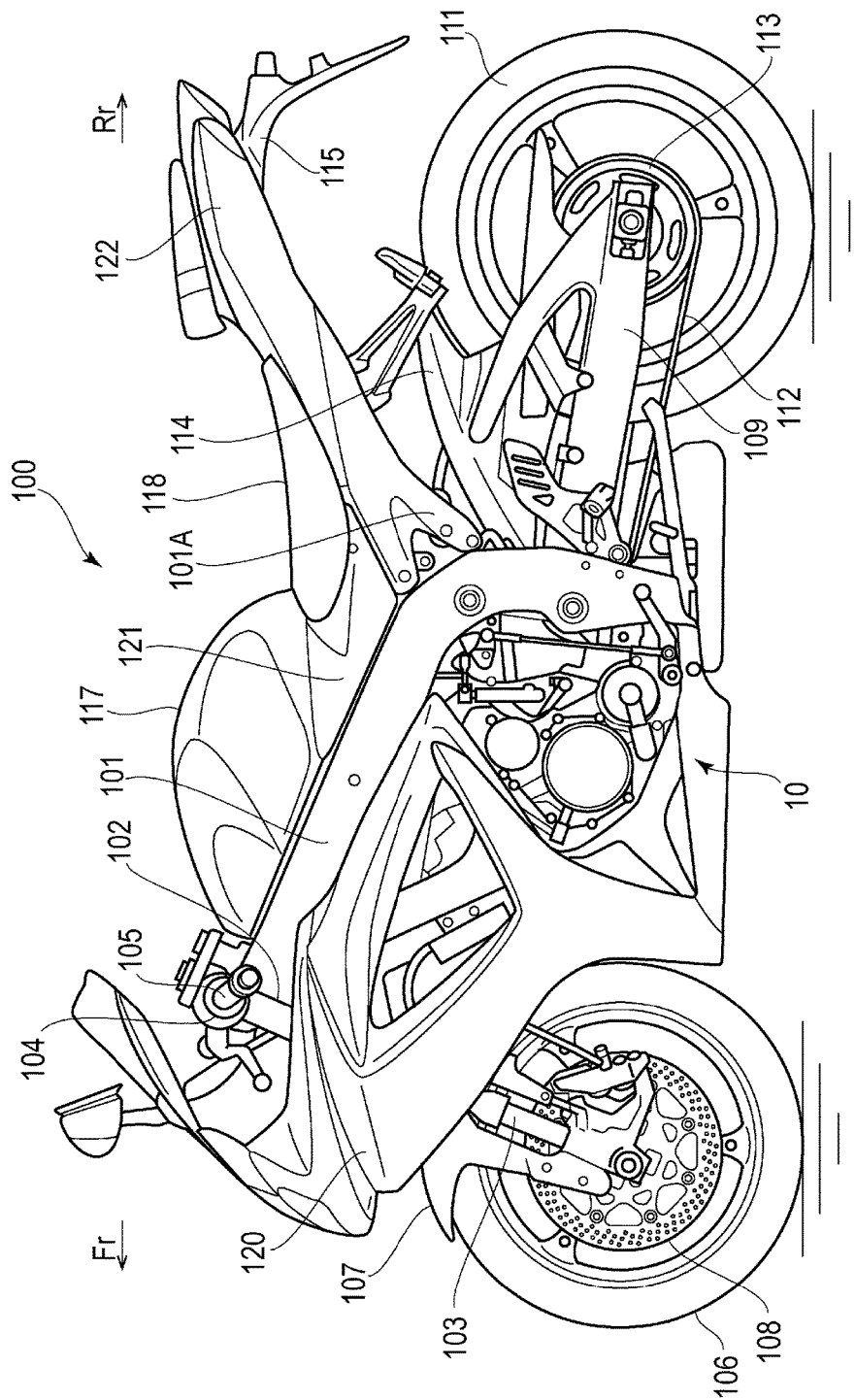
FIG. 1 is a left side view of a motorcycle that includes an engine according to this embodiment.

FIG. 1 is a left side view of a motorcycle that includes the crank chamber internal pressure reduction mechanism according to this embodiment. Firstly, a description will be given of an overall configuration of a motorcycle 100 with reference to FIG. 1. Including FIG. 1, in the respective drawings used in the following description, an arrow Fr and an arrow Rr indicate forward and rearward of the vehicle, respectively as necessary. An arrow R and an arrow L indicate the right side and the left side of the vehicle, respectively.

In FIG. 1, on the front portion of a vehicle body frame 101 (a main frame), which is made of steel or an aluminum alloy material, two front forks 103 are disposed on the right and left. The front forks 103 are turnably supported by a steering head pipe 102 to the right and left. A handlebar 104 is secured to the upper ends of the front forks 103. The handlebar 104 includes grips 105 on both ends. On the lower portion of the front forks 103, a front wheel 106 is rotatably supported. A front fender 107 is secured so as to cover the upper portion of the front wheel 106. The front wheel 106 includes a brake disc 108, which rotates integrally with the front wheel 106.

The vehicle body frame 101 is integrally joined to the rear portion of the steering head pipe 102 and is branched into two of right and left pair to the rear. The vehicle body frame 101 is disposed to extend widening from the steering head pipe 102 obliquely downward to the rear. The vehicle body frame 101 is a so-called twin-spar frame, which is applied to vehicles requiring high-speed performance. A seat rail 101A is appropriately inclined from the vicinity of the rear portion of the vehicle body frame 101 obliquely upward to the rear and extends to the rear to support a seat 118, which will be described later. To the rear portion of the vehicle body frame 101, a swing arm 109 is swingably joined. A rear shock absorber is installed in a predetermined manner between the vehicle body frame 101 and the swing arm 109. To the rear end of the swing arm 109, a rear wheel (driving wheel) 111 is rotatably supported. The rear wheel 111 is rotatively driven via a driven sprocket 113 around which a chain 112, which transmits power of an engine 10, which will be described later, is wound. At the peripheral area immediately close to the rear wheel 111, an inner fender 114, which covers the vicinity of the front upper portion of the rear wheel 111, is disposed. Above the inner fender 114, a rear fender 115 is disposed.

Air-fuel mixture constituted of air and fuel supplied from an air cleaner and a fuel supply device (not illustrated), respectively is supplied to the engine 10 mounted to the vehicle body frame 101. Exhaust gas after burning inside the engine 10 passes through an exhaust pipe and is exhausted from a muffler. A fuel tank is mounted to an upper side of the engine 10, and a tank cover 117 covers the fuel tank. The seat 118 is continuous with the rear side of the fuel tank.

A fairing 120 and a side cowl 121 mainly cover the front portion and the side portions of the vehicle as the exterior for the vehicle. A side cover or a seat cowl 122 covers the rear portion of the vehicle. These exterior members form the appearance form of the vehicle having a so-called streamline shape.

The following describes a configuration of the engine 10 as the internal combustion engine.

Figure 2:
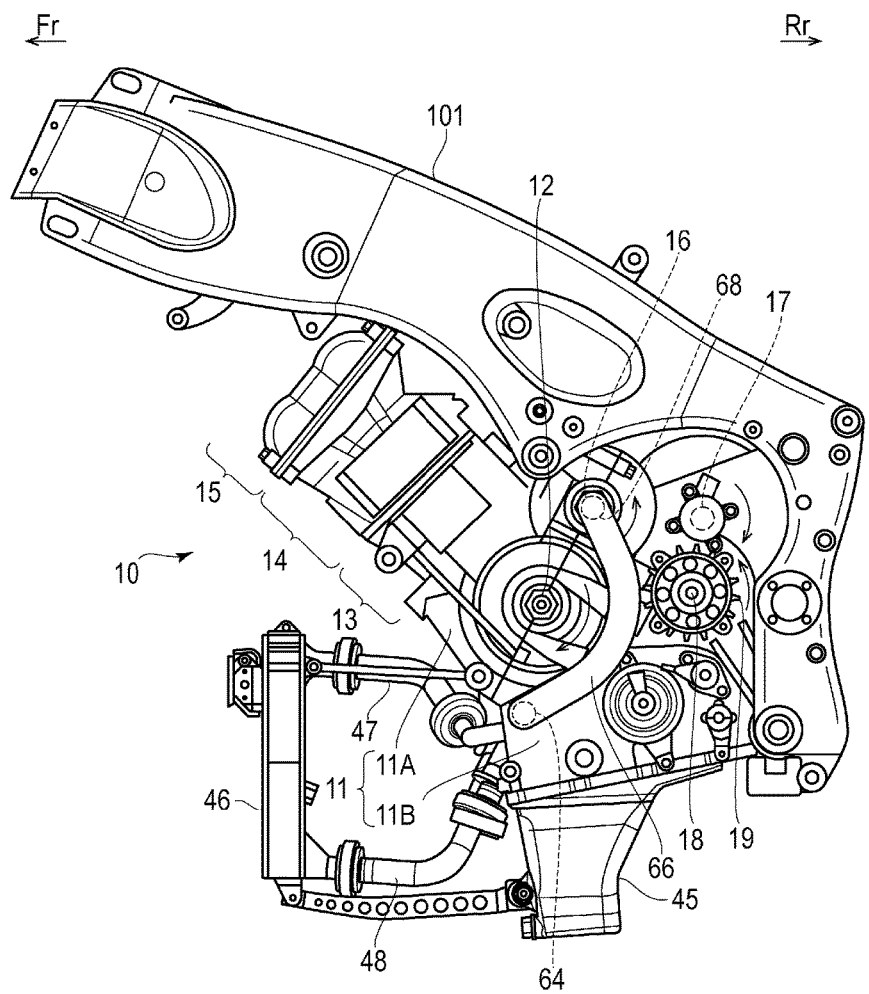
FIG. 2 is a side view illustrating an overall configuration of the engine.

FIG. 2 is a side view illustrating an overall configuration of the engine 10 according to this embodiment. The engine 10 of this embodiment employs a parallel multi-cylinder engine, specifically, a four-cycle parallel four-cylinder engine. The engine 10 is integrally combined with the vehicle body frame 101 via a plurality of engine mounts and acts as a rigid member of the vehicle body frame 101 by itself.

The engine 10 includes a crankcase 11, a cylinder 13, a cylinder head 14, and a cylinder head cover 15 continuously. The crankcase 11 houses a crankshaft 12 and rotatably supports the crankshaft 12. The cylinder 13 houses a piston in a vertically movable manner. The cylinder head 14 houses a valve gear. The cylinder head cover 15 is attached to and lids the cylinder head 14. With the engine 10 according to this embodiment, a cylinder axis line of the cylinder 13 inclines from the crankshaft 12 toward obliquely upward to the front. With engine 10 according to this embodiment, the valve gear housed in the cylinder head 14 is driven from the crankshaft 12 via a gear train (not illustrated).

With the engine 10 according to this embodiment, the crankcase 11 rotatably supports a balancer shaft 16 as a rotating shaft positioned obliquely upward to the rear of the crankshaft 12, a counter shaft 17 positioned rearward of the balancer shaft 16, and a drive shaft 18 positioned below the counter shaft 17, in addition to the crankshaft 12.

The rotation of the crankshaft 12 is transmitted to the balancer shaft 16, the counter shaft 17, and the drive shaft 18 in this order. After that, the rotation is transmitted from a drive sprocket 19, which is pivotably supported to an end portion of the drive shaft 18, to the chain 112. The rotation transmitted between the respective shafts via gears causes rotation directions of the shaft at the upstream and the shaft at the downstream in a power transmitting direction to be reverse directions.

As described above, since the engine 10 according to this embodiment includes the gears, the gears for the transmission of the rotation of the crankshaft 12 to the valve gear by the gear train and similar gears, more than those of usual engines, a gyro effect during travelling is generated larger.

Therefore, the gyro effect is restrained by rotating the crankshaft 12 in a direction different from the drive shaft 18 (see the arrow illustrated in FIG. 2). Accordingly, since the rotation direction of the crankshaft 12 is the reverse rotation to the rotation direction of the usual engines, the above-described balancer shaft 16 is interposed between the crankshaft 12 and the counter shaft 17 to return the rotation directions of the counter shaft 17 and the drive shaft 18 to the rotation direction to move the vehicle forward.

The following describes configurations of the crankcase 11 and a peripheral area of the crankcase 11.

Figure 3:
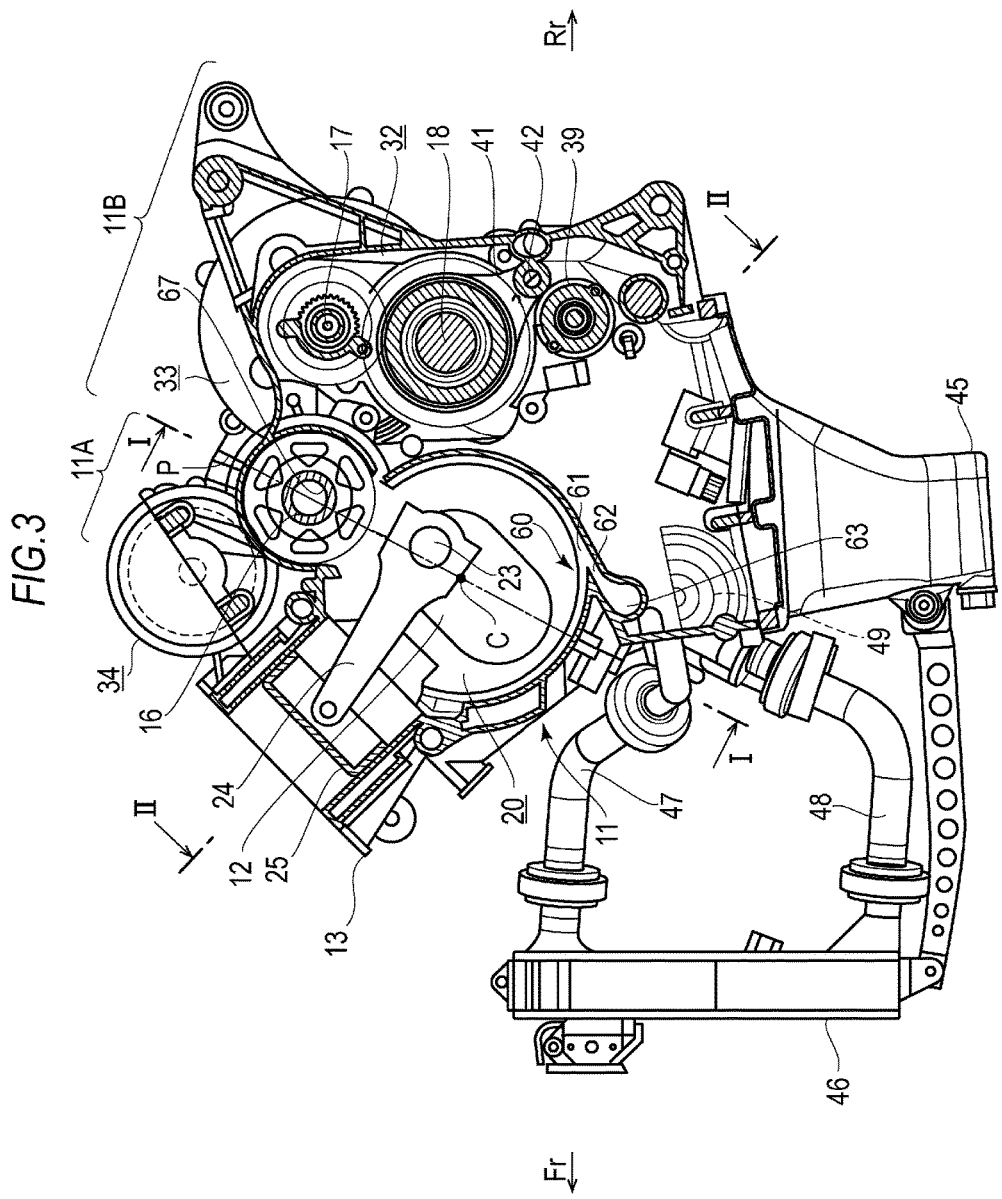
FIG. 3 is a cross-sectional view cut off a part of a crankcase.

FIG. 3 is a cross-sectional view cut off a part of the crankcase 11.

The crankcase 11 is divided into two, an upper case 11A and a lower case 11B, by a split surface P connecting an axis line C of the crankshaft 12 and an axis line of the balancer shaft 16. The crankcase 11 is partitioned by a crankshaft supporting portion, which will be described later, to form a crank chamber 20.

The plurality of crank chamber 20 are formed between the upper case 11A and the lower case 11B parallel in the vehicle width direction.

Figure 4:
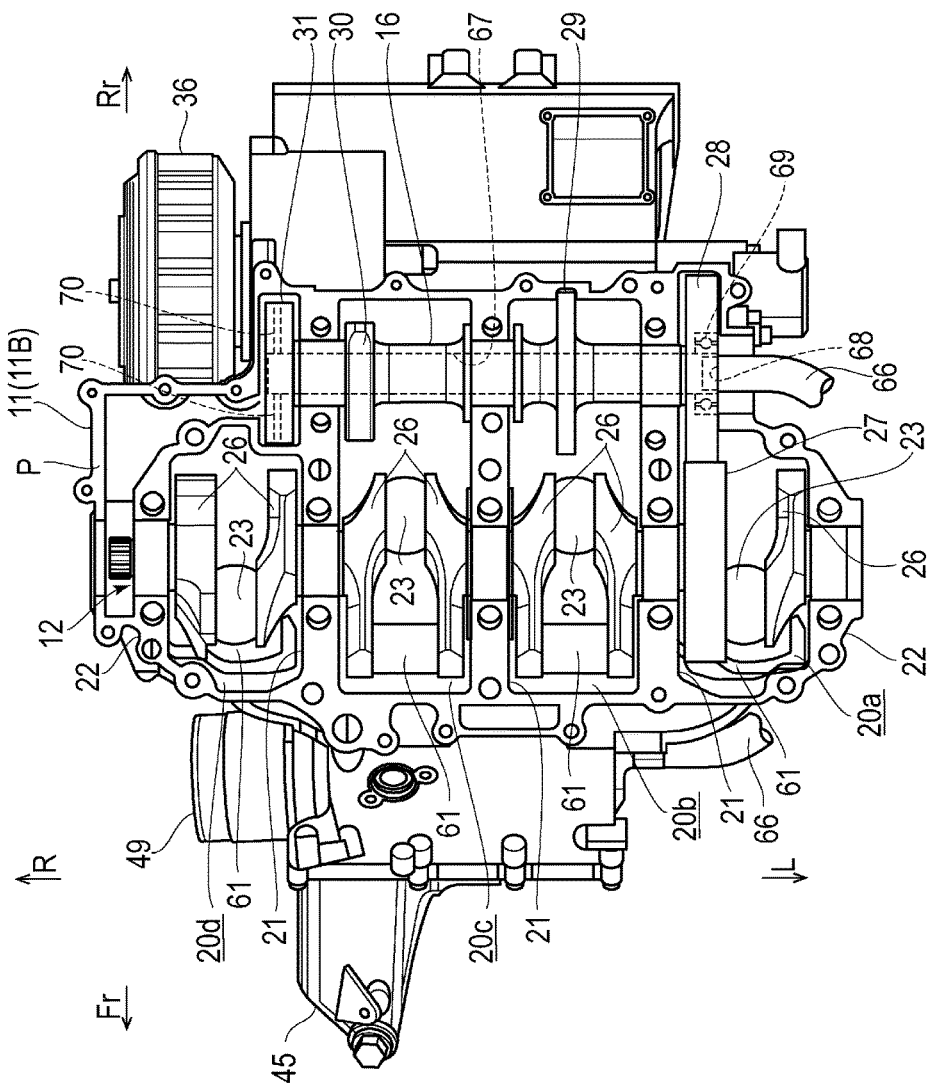
FIG. 4 is a drawing viewing a lower case of the crankcase from a direction perpendicular to a split surface.

The following describes a specific configuration of the crank chamber 20 with reference to FIG. 4. FIG. 4 is a drawing viewing the lower case 11B illustrated in FIG. 3 from an arrow direction perpendicular to the split surface P, that is, a drawing viewing the line I-I illustrated in FIG. 3 from the arrow direction.

The crankcase 11 includes, in an order from the left side along the vehicle width direction (the right-left direction), a first crank chamber 20a corresponding to a first cylinder, a second crank chamber 20b corresponding to a second cylinder, a third crank chamber 20c corresponding to a third cylinder, and a fourth crank chamber 20d corresponding to a fourth cylinder. The first crank chamber 20a to the fourth crank chamber 20d are each independently sealed.

The first crank chamber 20a to the fourth crank chamber 20d are partitioned by combining the crankshaft supporting portions 21 formed at the respective upper case 11A and lower case 11B with the split surface P. On the split surface P of the crankshaft supporting portion 21 of the lower case 11B illustrated in FIG. 4, an insertion hole for knock pin for positioning with the upper case 11A and a screw hole to be joined with the upper case 11A together are formed.

The first crank chamber 20a to the fourth crank chamber 20d house the crankshafts 12 rotatably supported to the crankshaft supporting portions 21, a sidewall 22 of the first crank chamber 20a, and the sidewall 22 of the fourth crank chamber 20d. As illustrated in FIG. 3, a connecting rod 24 is coupled to the crankshaft 12 via a crank pin 23. Pistons 25 are swingably mounted to distal ends of the respective connecting rods 24. The piston 25 vertically reciprocates inside the cylinders 13. Inner wall surfaces of the first crank chamber 20a to the fourth crank chamber 20d are formed into a smooth cylindrical shape approximately concentric with the axis line C of the crankshaft 12. This allows an interval between a rotating object such as the connecting rod 24, which rotates by the reciprocation motion of the piston 25, and a crank web; and the inner wall surface of crank chamber 20 to be uniform, thereby ensuring reducing a pumping loss between the rotating object and the inner wall surface.

As illustrated in FIG. 4, in the crankshaft 12, a crank web 26 and a crank drive gear (a drive gear) 27 are pivotably supported to the inside of the first crank chamber 20a. The pair of crank webs 26 are pivotably supported to the inside of the second crank chamber 20b to the fourth crank chamber 20d. The crank drive gear 27 inside the first crank chamber 20a transmits the rotation of the crankshaft 12 to the balancer shaft 16. In the first crank chamber 20a of this embodiment, the one of the pair of crank webs 26 are replaced by the crank drive gear 27, thus disposing the crank drive gear 27 inside the crank chamber 20.

The first crank chamber 20a to the third crank chamber 20c house the balancer shaft 16 rotatably journaled by the crankshaft supporting portions 21. A crank driven gear 28 is pivotably supported to the balancer shaft 16 inside the first crank chamber 20a, a generator drive gear 29 is pivotably supported to the balancer shaft 16 inside the second crank chamber 20b, and a balancer weight 30 is pivotably supported to the balancer shaft 16 inside the third crank chamber 20c. The crank driven gear (the driven gear) 28 is a gear meshing with the crank drive gear 27. The generator drive gear 29 is a gear to drive a generator disposed in a generator chamber 34 illustrated in FIG. 3. The balancer weight 30 attenuates vibrations of the engine 10 generated by the rotation of the crankshaft 12.

A primary drive gear 31 is pivotably supported to an end portion on one side (a right side) of the balancer shaft 16.

The primary drive gear 31 transmits the rotation of the balancer shaft 16 to the counter shaft 17. That is, the primary drive gear 31 is a drive transmission component that rotates integrally with the balancer shaft 16. The primary drive gear 31 is disposed outside the crank chamber 20, specifically, obliquely upward to the rear of the fourth crank chamber 20d. The primary drive gear 31 is disposed in a space communicated with a transmission chamber 32, which will be described later.

Now referring again to FIG. 3, the transmission chamber 32 is formed at the rear of the crank chamber 20 by being divided by a case partition wall of the crankcase 11. A clutch chamber 33 is disposed to the right of the transmission chamber 32. The generator chamber 34 and a similar member are disposed above the crank chamber 20.

In the transmission chamber 32, the counter shaft 17 and the drive shaft 18 are rotatably journaled parallel to the crankshaft 12.

Figure 5:
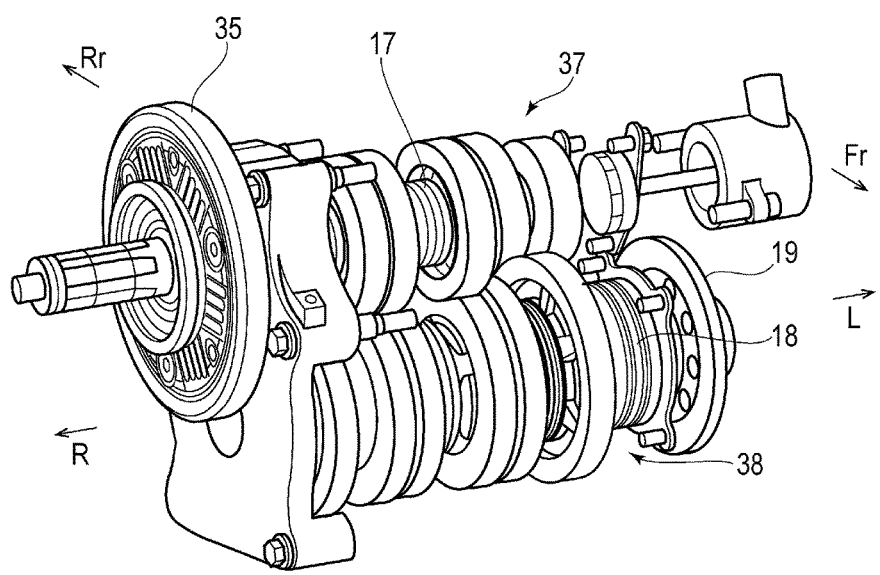
FIG. 5 is a perspective view viewing a configuration around a counter shaft and a drive shaft from a front side.

The following describes configurations of peripheral areas of the counter shaft 17 and the drive shaft 18 with reference to FIG. 5. FIG. 5 is a perspective view viewing the configurations around the counter shaft 17 and the drive shaft 18 from the front side. As illustrated in FIG. 5, a primary driven gear 35 is pivotably supported to the right of the counter shaft 17. The primary driven gear 35 rotates integrally with the counter shaft 17 and always meshes with the above-described primary drive gear 31. The primary driven gear 35 is disposed inside the clutch chamber 33. A clutch 36 is disposed immediately right side of the primary driven gear 35 (see FIG. 4). The clutch 36 is covered with a clutch cover (not illustrated) from the right side of the crankcase 11. In accordance with an operation by an occupant via a clutch lever, the clutch 36 makes the transmission of the rotation from the primary driven gear 35 to the counter shaft 17 intermittent.

The counter shaft 17 includes a plurality of shift gears 37. The drive shaft 18 also includes a plurality of shift gears 38. In accordance with a shift operation by the occupant, some of the shift gears 37 of the counter shaft 17 or some of the shift gears 38 of the drive shaft 18 axially move. The axial movement of the shift gears 37 and 38 changes a combination of the shift gears 37 and 38 that transmit the rotation from the counter shaft 17 to the drive shaft 18. Accordingly, after the rotation of the crankshaft 12 goes through the balancer shaft 16, the rotation is shifted between the counter shaft 17 and the drive shaft 18 according to the combination of the shift gears 37 and 38, and then is output to the drive sprocket 19.

As illustrated in FIG. 3, a shift cam 39 is turnably journaled parallel to the crankshaft 12 below the drive shaft 18 in the transmission chamber 32. The shift cam 39 turns in a stepwise fashion by a constant angle in accordance with the shift operation by the occupant. The shift cam 39 forms a plurality of cam grooves that engage with a shift fork 41. The shift fork 41 is journaled movable along the axis line direction by a shift fork shaft 42. The shift fork shaft 42 is supported parallel to the crankshaft 12 obliquely upward to the rear of the shift cam 39. The shift fork 41 engages with some of the shift gears 38 of the drive shaft 18.

Turning the shift cam 39 in accordance with the shift operation by the occupant moves the shift fork 41 along the axis line direction of the shift fork shaft 42 in accordance with a shape of the cam grooves on the shift cam 39. This moves some of the shift gears 38 in the axis line direction and changes the combination of the shift gears 37 and 38, which transmit the rotation from the counter shaft 17 to the drive shaft 18.

As illustrated in FIG. 2 and FIG. 3, an oil pan 45 is combined to a lower end surface of the crankcase 11 via a plurality of fixation screws. A part of the oil pan 45 projects from a right side of the exhaust pipe downward to avoid an interference with the exhaust pipe. An oil pump (not illustrated) is disposed on a right side inside the crankcase 11 and above the oil pan 45. A transmission of the rotation of the primary driven gear 35, which is pivotably supported to the counter shaft 17, via the plurality of gears drives the oil pump.

An oil cooler 46 is supported to a position in front of the crankcase 11 and the oil pan 45 and away from the crankcase 11 and the oil pan 45 via a plurality of stays. One end of an inlet hose 47 is combined to an upper portion of the oil cooler 46. One end of an outlet hose 48 is combined to the lower portion of the inlet hose 47. The other end of the inlet hose 47 is combined to a front surface of the lower case 11B in the crankcase 11 and is coupled to the oil pump inside the crankcase 11. The other end of the outlet hose 48 goes through the lower case 11B in the crankcase 11 and the front side of the oil pan 45 and is combined to an approximately corner portion formed of the front surface and a right side surface of the lower case 11B. Then, the other end of the outlet hose 48 is coupled to the inside of an oil filter 49 removably mounted to the right side surface of the lower case 11B.

The oil pump suctions engine oil accumulated in the oil pan 45 and pressure-feeds the engine oil to the oil cooler 46 via the inlet hose 47. The engine oil pressure-fed to the oil cooler 46 is cooled and is pressure-fed from the outlet hose 48 to the oil filter 49. A foreign matter contained in the engine oil is removed from the engine oil pressure-fed to the oil filter 49 and the engine oil is purified, and then the engine oil is supplied to the respective units of the engine 10. Specifically, the engine oil is supplied to, for example, the valve gear of the cylinder head 14, the shift gears 37 and 38, the crankshaft supporting portions 21, and the pistons 25. The engine oil that has lubricated the shift gears 37 and 38 and a similar member passes through the transmission chamber 32 and is recovered to the oil pan 45. The engine oil that has lubricated the crankshaft supporting portions 21, the pistons 25, and a similar member is recovered to the first crank chamber 20a to the fourth crank chamber 20d. The first crank chamber 20a to the fourth crank chamber 20d are internally filled with blow-by gas in addition to the engine oil.

Figure 6:
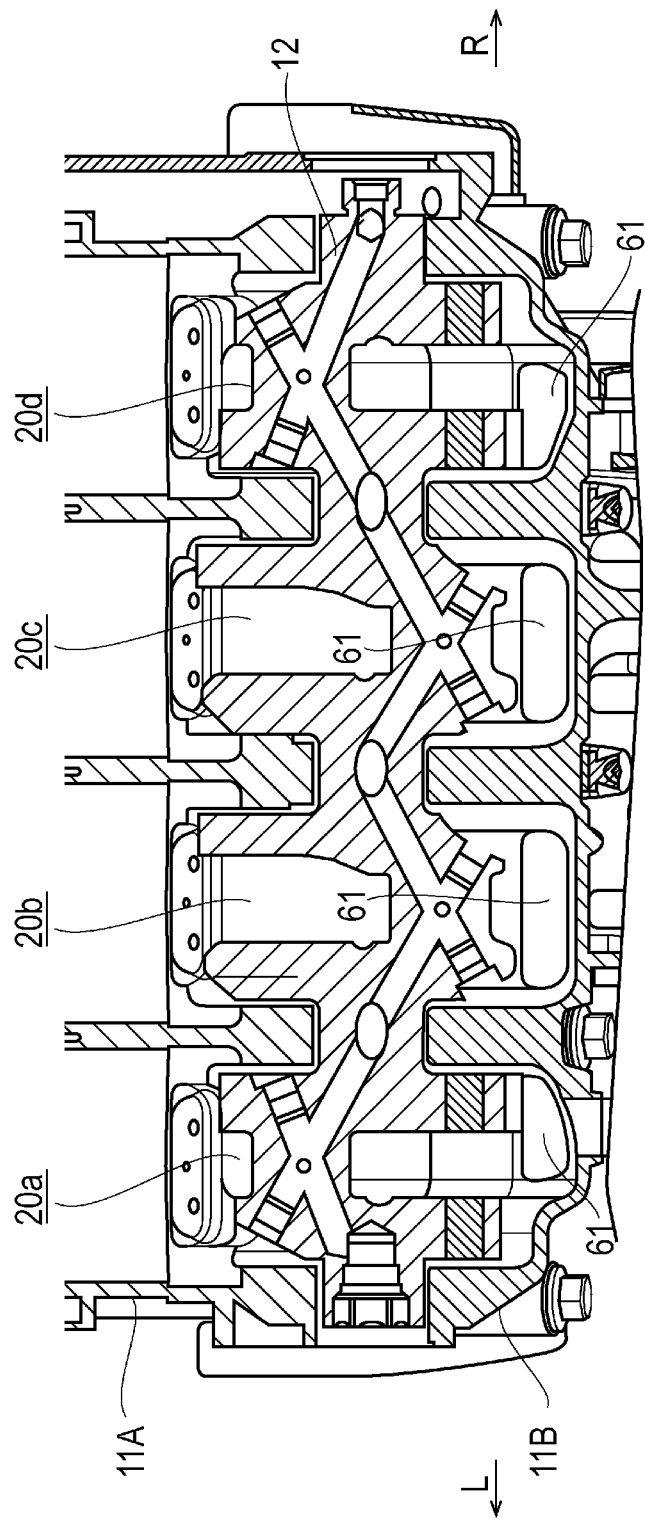
FIG. 6 is a cross-sectional view cut off a part of the crankcase.
Figure 7:
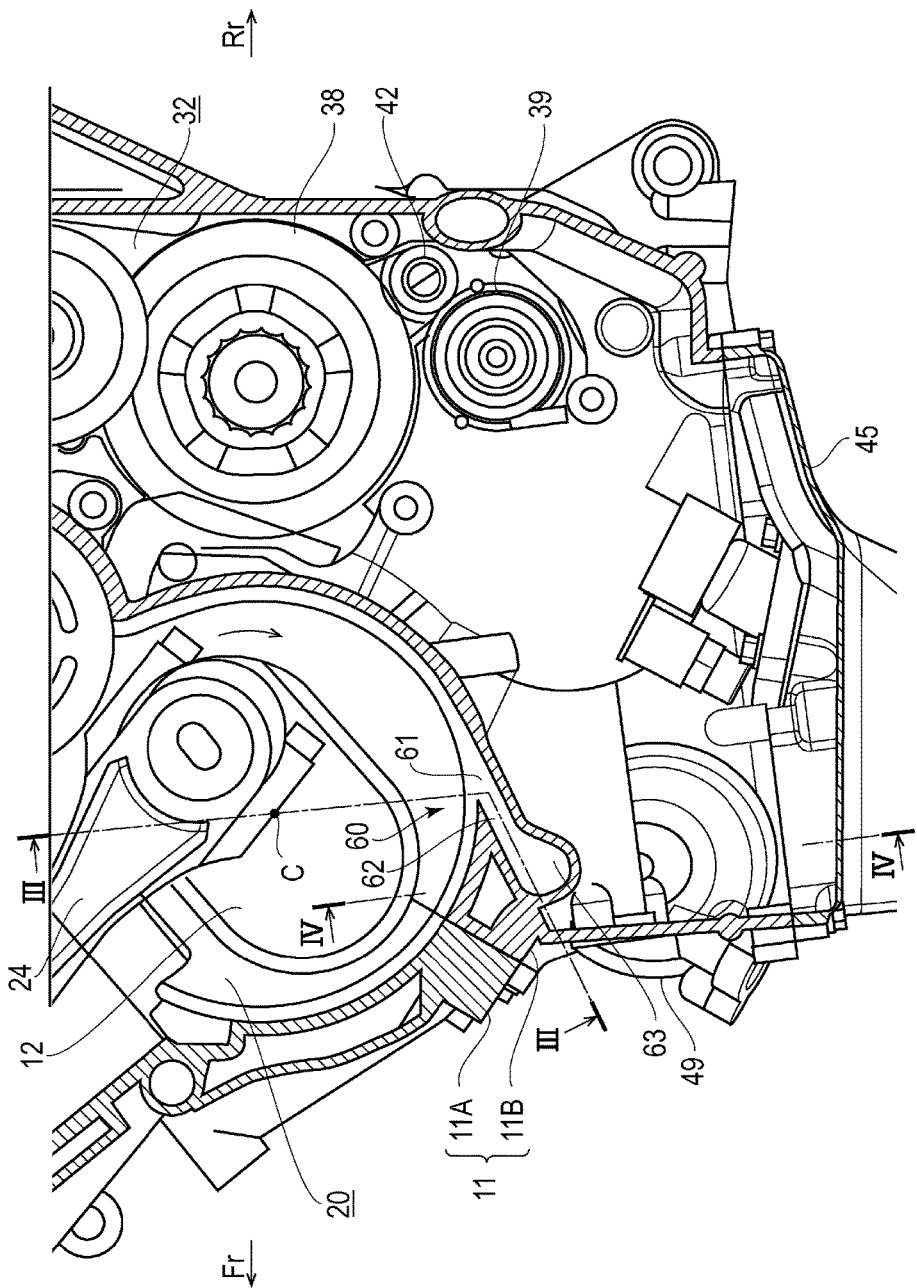
FIG. 7 is an enlarged view enlarging a part of the crankcase.
Figure 8:
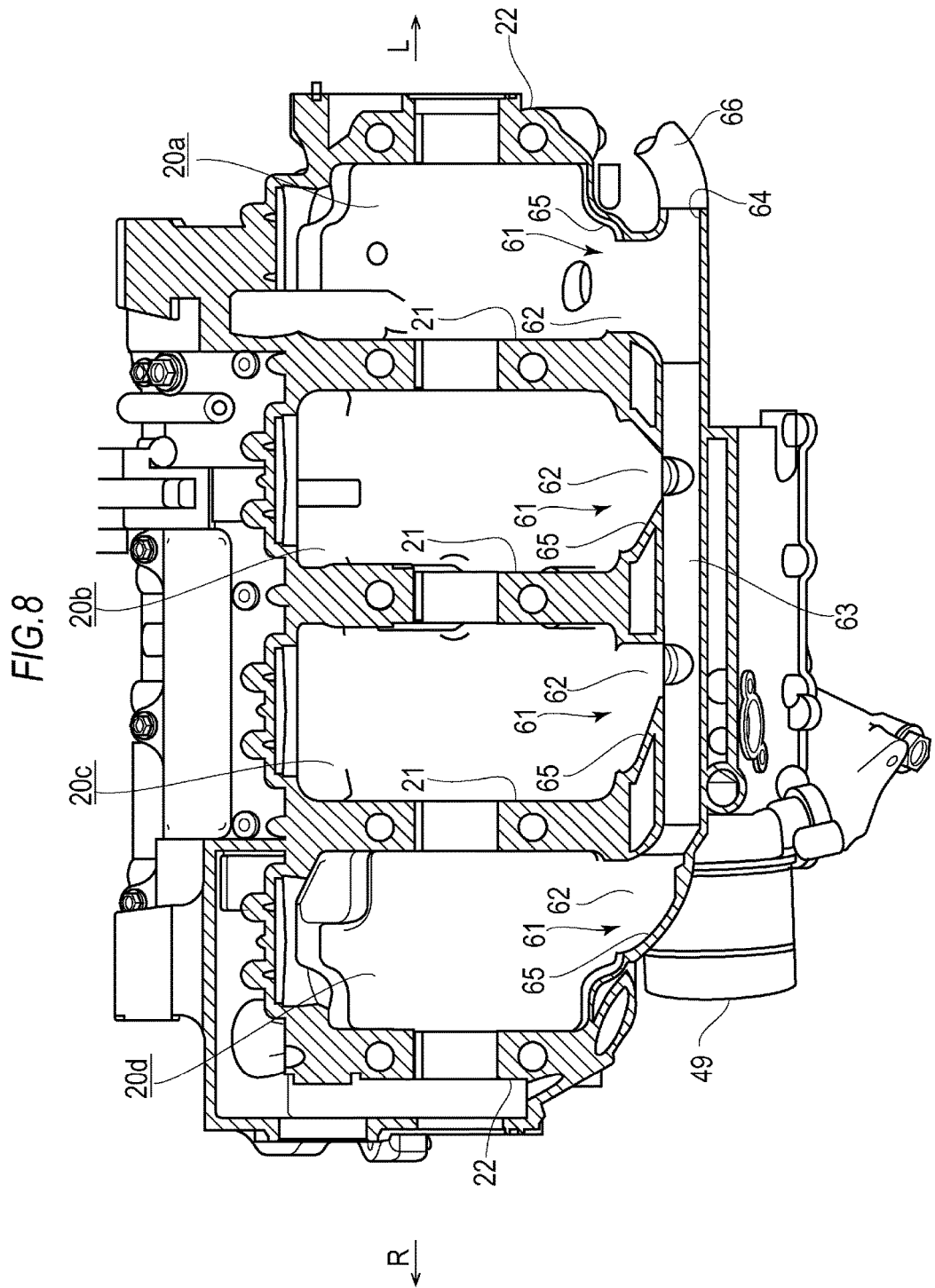
FIG. 8 is a cross-sectional view cut off a part of the crankcase.
Figure 9:
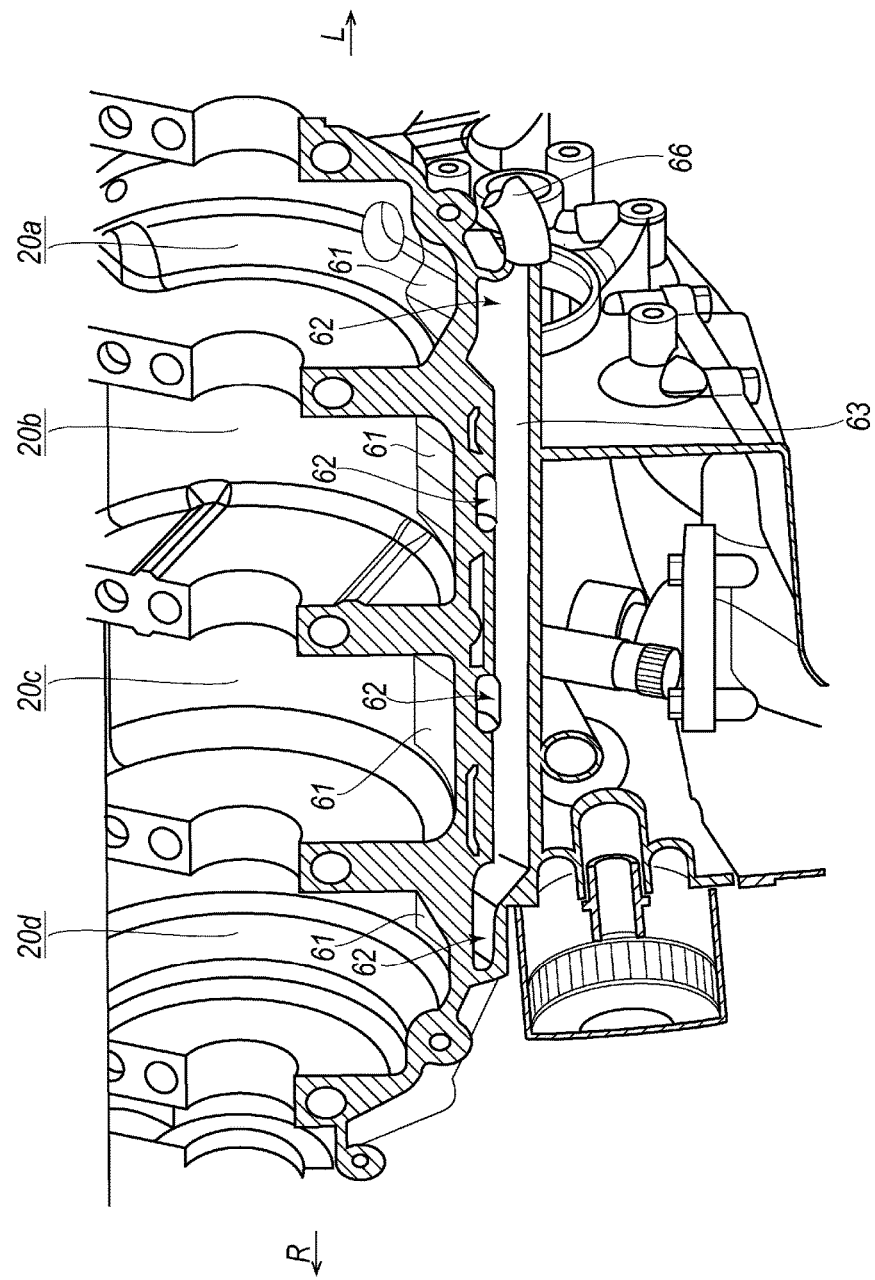
FIG. 9 is a perspective view cut off a part of the crankcase.

The following describes a crank chamber internal pressure reduction mechanism according to this embodiment. FIG. 6 is a cross-sectional view cut off along the line II-II illustrated in FIG. 3. FIG. 7 is an enlarged view partially enlarging FIG. 3. FIG. 8 is a cross-sectional view cut off along the line illustrated in FIG. 7. FIG. 9 is a cross-sectional view cut off along the line IV-IV illustrated in FIG. 7.

Openings 61 are formed on respective inner wall surfaces of bottom portions 60 of the first crank chamber 20a to the fourth crank chamber 20d in this embodiment. As illustrated in FIG. 6 and FIG. 8, the openings 61 are each formed across chamber widths of the respective first crank chamber 20a to fourth crank chamber 20d. As illustrated in FIG. 7, the opening 61 is formed at a position overlapping with a straight line drawn from the axis line C on the crankshaft 12.

A discharge passage 62 is formed inclined from the opening 61 obliquely downward to the front. The discharge passage 62 is a passage to which the engine oil and the blow-by gas (hereinafter also referred to as emissions) are discharged from the first crank chamber 20a to the fourth crank chamber 20d via the openings 61. The discharge passages 62 are formed integrally with the lower case 11B. The discharge passage 62 extends in a tangent direction of a cylindrical shape of the crank chamber 20. Stirred by the crank web 26 and a similar member in the crank chamber 20, the engine oil moves in a direction identical to the rotation direction (the arrow direction illustrated in FIG. 7) of the crankshaft 12.

Accordingly, extending the discharge passage 62 from the opening 61 as described above allows the engine oil to flow into the discharge passage 62 with kinetic energy maintained.

The discharge passages 62 communicate with a joining passage 63 at a side opposite from the openings 61. The joining passage 63 is a passage that causes the emissions discharged from the respective discharge passages 62 to converge. The joining passage 63 is formed integrally with the lower case 11B. The joining passage 63 is positioned on the lower side of the crank chamber 20. The joining passage 63 extends in a direction perpendicular to the extending direction of the discharge passages 62, namely, the vehicle width direction. Specifically, as illustrated in FIG. 8 and FIG. 9, the joining passage 63 is formed from the first crank chamber 20a to the fourth crank chamber 20d. Further, the joining passage 63 reaches a left end of the crankcase 11 and is open at an opening 64 formed on a sidewall to the left of the crankcase 11.

The joining passage 63 enlarges a passage cross-sectional area more than a passage cross-sectional of the discharge passages 62. Accordingly, enlarging the passage cross-sectional area at the joining passage 63 where a pressure loss occurs when the emissions are discharged ensures reducing the pressure loss, thereby ensuring improving suction efficiency of the emissions.

The discharge passages 62 each form reduced portions 65 where the passage cross-sectional area gradually reduces from the openings 61 to the joining passage 63. In this embodiment, joining the discharge passages 62 coupled to the crank chambers 20 together communicates the mutual crank chambers 20 via the joining passage 63. Accordingly, even if a pumping by the pistons 25 generates a pressure difference between the crank chambers 20, the reduced portions 65, which are reduced gradually, ensure reducing an influence of pressure given from the one crank chamber 20 to another crank chamber 20.

A discharge hose 66 is coupled to the opening 64 on the joining passage 63. The discharge hose 66 is a passage to discharge the emissions converged by the joining passage 63 from the crankcase 11. As illustrated in FIG. 2, the discharge hose 66 extends from the opening 64 upward along the sidewall to the left of the crankcase 11 and is coupled to the balancer shaft 16.

The above-described discharge passages 62, joining passage 63, and discharge hose 66 correspond to an example of a first discharge passage.

As illustrated in FIG. 4, the balancer shaft 16 of this embodiment internally forms a discharge passage 67 along the axis line direction. The discharge passage 67 corresponds to an example of a second discharge passage communicating with the first discharge passage.

At one end side of the balancer shaft 16 in the axial direction, specifically an end surface side of the crank driven gear 28, an opening 68 is formed. That is, the opening 68 opens the one end side of the discharge passage 67 in the axial direction. A bearing 69 is mounted to this opening 68. The above-described discharge hose 66 is coupled to the opening 68 via the bearing 69. Accordingly, the discharge hose 66 and the discharge passage 67 are communicated with one another.

On the other hand, the other end side of the balancer shaft 16 in the axial direction, specifically, the primary drive gear 31 forms thin holes 70 radially extending from the discharge passage 67 outside in a radial direction. The holes 70 correspond to an example of a third discharge passage communicated with the second discharge passage. The holes 70 open between adjacent teeth of the primary drive gear 31. That is, the holes 70 open not at distal ends of the teeth but at bottoms of the teeth such that strength of the respective teeth of the primary drive gear 31 is not deteriorated. The primary drive gear 31 thus the holes 70 are formed corresponds to an example of the suction mechanism. An end surface side of the primary drive gear 31 is not open like the crank driven gear 28 but is obstructed.

Accordingly, the first crank chamber 20a to the fourth crank chamber 20d are each communicated with a space where the primary drive gear 31 is disposed, namely, the transmission chamber 32, via the discharge passages 62, the joining passage 63, the discharge hose 66, the discharge passage 67, and the holes 70.

The following specifically describes operations of the crank chamber internal pressure reduction mechanism configured as described above. The crank chamber internal pressure reduction mechanism reduces an internal pressure of the respective crank chambers 20 that has recovered the engine oil and the blow-by gas to forcibly suction and discharge the engine oil and the blow-by gas.

Specifically, the rotation of the crankshaft 12 causes the crank drive gear 27 pivotably supported to the crankshaft 12 to rotate the balancer shafts 16 via the crank driven gear 28. The rotation of the primary drive gear 31 according to the rotation of the balancer shaft 16 discharges the gas inside the holes 70 on the primary drive gear 31 to the outside of the primary drive gear 31, namely, the transmission chamber 32, by centrifugal force. Since the discharge passage 67 in the balancer shaft 16, which communicates with the holes 70 on the primary drive gear 31, becomes the negative pressure, the discharge hose 66, the joining passage 63, the discharge passages 62, and the respective crank chambers 20, which communicate with the discharge passage 67, become the negative pressure. Accordingly, the emissions inside the respective crank chambers 20 are forcibly suctioned to be discharged to the transmission chamber 32 via the discharge passages 62, the joining passage 63, the discharge hose 66, the discharge passage 67, and the holes 70. At this time, since the first crank chamber 20a to the fourth crank chamber 20d are independently sealed excluding the above-described route for discharge, this makes the efficient discharge of the emissions possible. Accordingly, the engine oil and the blow-by gas do not remain in the first crank chamber 20a to the fourth crank chamber 20d, and the crankshaft 12 can be rotated free from resistance in the first crank chamber 20a to the fourth crank chamber 20d, ensuring a reduction in pumping loss.

The engine oil discharged to the transmission chamber 32 lubricates the shift gear 37 of the counter shaft 17, the shift gear 38 of the drive shaft 18, and a similar member, and then drops to the oil pan 45 for accumulation.

Thus, this embodiment includes the suction mechanism in the balancer shaft 16, the rotating shaft to which the rotation force of the crankshaft 12 is transmitted. This eliminates the need for separately adding a dedicated component to discharge the emissions such as the scavenging pump and a reed valve. This allows the downsizing and weight reduction of the crankcase 11, ensuring improving operability of the vehicle using the crankcase 11.

The discharge passage 67 as the second passage to discharge the emissions is disposed inside the balancer shaft 16, the rotating shaft. This eliminates the need for disposing the second discharge passage to the crankcase 11, ensuring simplifying the structure of the crankcase 11 and ensuring improving the productivity.

This embodiment includes the suction mechanism at the drive transmission component provided to the balancer shaft 16, that is, the primary drive gear 31. This eliminates the need for separately adding a dedicated component to discharge the emissions, allowing the downsizing and weight reduction of the crankcase 11.

This embodiment disposes the suction mechanism at the balancer shaft 16 closest to the crankshaft 12. This ensures shorting the distance of the discharge passage from the respective crank chambers 20 to the balancer shaft 16.

Since the balancer shaft 16 rotates at high speed identical to the crankshaft 12, disposing the suction mechanism at the balancer shaft 16 allows effectively discharging the emissions in the crank chambers 20 compared with the case where the suction mechanism is disposed at another rotating shaft.

While the present invention has been described with the above-described embodiments, the present invention is not limited only to the above-described embodiments. Changes and similar modification are possible within the scope of the present invention.

The above-described embodiment describes the case where the rotating shaft including the suction mechanism is the balancer shafts 16 to which the rotation force is transmitted directly from the crankshaft 12. However, this should not be construed in a limiting sense. That is, the rotating shaft including the suction mechanism may be the counter shaft 17 and the drive shaft 18 to which the rotation force is directly or indirectly transmitted from the crankshaft 12. In this case, the holes 70 disposed on the counter shaft 17 or the drive shaft 18 are communicated with a space different from the crank chamber 20.

The above-described embodiment describes the case where the balancer shaft 16, which includes the suction mechanism, is disposed between the crankshaft 12 and the counter shaft 17. However, this should not be construed in a limiting sense. For example, the balancer shaft 16, which includes the suction mechanism, may not be used to rotate the counter shaft 17 but maybe disposed alone at the peripheral area of the crankshaft 12. In this case, the holes 70 disposed at the balancer shaft 16 are communicated with the space different from the crank chamber 20.

The above-described embodiment describes the case where the discharge hose 66 is used to communicate between the joining passage 63 and the discharge passage 67 in the balancer shaft 16. However, this should not be constructed in a limiting sense. A passage may be formed from the joining passage 63 to the inside of the crankcase 11 to directly communicate between the formed passage and the discharge passage 67 in the balancer shaft 16.

The above-described embodiment describes the case where the emissions inside the crank chamber 20 are discharged to the transmission chamber 32 formed integrally with the crank chamber 20. However, this should not be constructed in a limiting sense. The emissions may be discharged to the transmission chamber 32 formed separately from the crank chamber 20.

The above-described embodiment describes the case where the emissions inside the crank chamber 20 are discharged to the transmission chamber 32. However, this should not be constructed in a limiting sense. The discharge may be discharged to a space different from the crank chamber 20 and the transmission chamber 32.

The above-described embodiment describes the case where the rotation direction of the crankshaft 12 is the reverse rotation to the rotation direction of the usual engines. However, this should not be constructed in a limiting sense. The rotation direction of the embodiment may be the rotation direction identical to the rotation direction of the usual engines.

The above-described embodiment describes the case where the engine 10 is the parallel four-cylinder engine. However, this should not be constructed in a limiting sense. The engine 10 may be an engine of different arrangement (for example, a V engine) and with different number of cylinders (for example, single cylinder and cylinders other than four cylinders). At this time, for example, with the single cylinder, the joining passage 63 needs not to be formed. This allows the discharge hose 66 to be directly communicated from the discharge passage 62.

The above-described embodiment describes the case where the engine 10 is applied to the motorcycle. However, this should not be constructed in a limiting sense. The engine 10 is also applicable to a vehicle with similar structure.

The present invention includes the suction mechanism to the rotating shaft to which the rotation force is transmitted from the crankshaft. This eliminates the need for the dedicated component to discharge the discharge in the crank chamber side, thereby ensuring downsizing and weight reduction.

What is claimed is:

1. A crank chamber internal pressure reduction mechanism for internal combustion engine that forcibly suctions an emission in a crank chamber of a crankcase to discharge the emission, the crank chamber internal pressure reduction mechanism comprising:
    a crankshaft rotatably supported to the crankcase;
    a rotating shaft to which a rotation force is directly or indirectly transmitted from the crankshaft;
    a suction mechanism disposed at the rotating shaft, the suction mechanism rotating integrally with the rotating shaft;

a first discharge passage to which the emission is discharged from the crank chamber; and a second discharge passage communicated with the first discharge passage, the second discharge passage being disposed inside the rotating shaft, wherein the suction mechanism includes a third discharge passage communicated with the second discharge passage, the third discharge passage extending outside the rotating shaft in a radial direction to communicate with an external space.

2. The crank chamber internal pressure reduction mechanism for internal combustion engine according to claim 1, wherein the suction mechanism is disposed at a drive transmission component provided to the rotating shaft.

3. The crank chamber internal pressure reduction mechanism for internal combustion engine according to claim 1, wherein the rotating shaft is a balancer shaft to which a rotation force is transmitted directly from the crankshaft.

\* \* \* \* \*